(12) United States Patent
Mateu Codina et al.

(10) Patent No.: US 11,135,810 B2
(45) Date of Patent: Oct. 5, 2021

(54) BREATHABLE, WATERPROOF MULTI-LAYERED LEATHER MATERIAL AND LEATHER PRODUCT INCLUDING SAID LEATHER MATERIAL

(71) Applicant: MAT PRODUCT & TECHNOLOGY, SLU, Barcelona (ES)

(72) Inventors: Xavier Mateu Codina, Barcelona (ES); Colin Ramsay Bell, Barcelona (ES)

(*) Notice: Subject to any disclaimer, the term of this patent is extended or adjusted under 35 U.S.C. 154(b) by 78 days.

(21) Appl. No.: 16/448,665

(22) Filed: Jun. 21, 2019

(65) Prior Publication Data

US 2019/0389177 A1 Dec. 26, 2019

(30) Foreign Application Priority Data

Jun. 21, 2018 (ES) ................. ES201830958

(51) Int. Cl.
*B32B 7/12* (2006.01)
*B32B 9/02* (2006.01)
*B32B 3/26* (2006.01)

(52) U.S. Cl.
CPC .............. *B32B 9/025* (2013.01); *B32B 3/266* (2013.01); *B32B 7/12* (2013.01); *B32B 2250/03* (2013.01); *B32B 2255/26* (2013.01); *B32B 2307/724* (2013.01); *B32B 2307/73* (2013.01); *B32B 2437/00* (2013.01); *B32B 2437/02* (2013.01); *B32B 2439/06* (2013.01); *B32B 2479/00* (2013.01)

(58) Field of Classification Search
CPC .............. A41D 31/102; B32B 2250/03; B32B 2255/20; B32B 2255/26; B32B 2307/416; B32B 2307/724; B32B 2307/7265; B32B 2307/73; B32B 2437/00; B32B 2437/02; B32B 2439/06; B32B 2439/46; B32B 2439/62; B32B 2479/00; B32B 2571/00; B32B 2601/00; B32B 3/02; B32B 3/08; B32B 3/266; B32B 5/24; B32B 7/12; B32B 7/14; B32B 9/025; B32B 9/04; C09D 175/04; C14C 11/006; C14C 9/00; C14B 5/00; C14B 7/02
See application file for complete search history.

(56) References Cited

U.S. PATENT DOCUMENTS

2009/0188134 A1* 7/2009 Polegato Moretti ..... A43B 9/02
36/3 B

* cited by examiner

*Primary Examiner* — Lawrence D Ferguson
(74) *Attorney, Agent, or Firm* — Eugenio J. Torres-Oyola; Victor M. Rodriguez-Reyes; Rafael Rodriguez-Muriel

(57) ABSTRACT

A multi-layered material that includes a layer of natural leather or collagen leather with holes and/or micro-holes and coated with a hydrophobic agent, which is superimposed and adhered, by means of hydrolysis-resistant adhesives, said adhesives being arranged in a non-laminar fashion, to a layer of waterproof, breathable material to prevent the passage of water and to allow the passage of air therethrough.

12 Claims, 2 Drawing Sheets

BREATHABLE, WATERPROOF MULTI-LAYERED LEATHER MATERIAL AND LEATHER PRODUCT INCLUDING SAID LEATHER MATERIAL

FIELD OF THE ART

The present invention relates to a breathable, waterproof multi-layered leather material that allows the passage of air and vapour therethrough, but which prevents the passage of water, and a leather product including said breathable, waterproof multi-layered leather material, this multi-layered material being liable to be used in the manufacturing of all types of clothing, rucksacks or briefcases or in upholstery.

STATE OF THE ART

The use of tanned leather is known for the manufacturing of clothing, rucksacks and upholstery.

When the leather is lacking protective surface treatments, it is known as full grain leather. Full grain leather is partially breathable and also presents high water absorption, whereby, when it comes into contact with water, it gets wet and it allows the passage of water therethrough.

When the leather is provided with a protective surface treatment, for example a polyurethane varnish, it becomes waterproof, but it also loses its breathable capability, whereby it becomes airtight.

The creation of holes or micro-holes is also known in leather so as to improve its breathability, typically leather provided with a protective surface treatment, but in such a case water can go through the holes, whereby the leather loses its waterproof properties.

ES2142620T3 describes a shoe provided with a breathable, waterproof sole consisting of a perforated sole, a waterproof, breathable layer and an insole which is suggested to be of a breathable material or that is perforated, leather being cited as an option.

EP0619959A1 also describes a breathable, waterproof shoe sole very similar to the above.

In these two known solutions, the leather layer can absorb water, which produces its swelling, strain and the appearance of undesirable odours, both when using full grain leather, which is absorbent, and using leather provided with a protective surface treatment, since the holes or micro-holes go through that protective coating and leave the exposed leather uncoated on the side walls inside the ducts formed by said holes or micro-holes.

Furthermore, the creation of holes or micro-holes in an absorbent material such as leather causes said water droplets, when they settle on its surface, to be absorbed towards the interior of the holes or micro-holes by capillary action.

BRIEF DESCRIPTION OF THE INVENTION

The present invention relates to a breathable, waterproof multi-layered leather material that includes, according to a known structure, the following layers superimposed and adhered by means of hydrolysis-resistant adhesives arranged in a non-laminar fashion, that is, not as a continuous layer, allowing for breathability, also including the following layers:

- a natural leather or collagen leather layer, this leather layer including holes and/or micro-holes to increase its breathability;
- a layer of waterproof, breathable material to prevent the passage of water and to allow for the passage of air therethrough.

It is understood that the hydrolysis-resistant adhesive is an adhesive that does not degrade in contact with water or humidity, and it will be understood that its non-laminar arrangement is an arrangement that avoids the formation of a continuous sheet of adhesive between the layers to be adhered, since said continuous sheet might prevent the breathability of the resulting material.

In order to retain breathability, said adhesive may be arranged, for instance, in the shape of dots, lines or be dispersed in the form of powder, granules or drops on one of the layers to be adhered in order to proceed to its subsequent activation; for example, by means of heat, pressure or an activating agent, producing its adhesion.

It will be understood that natural leather is the leather obtained from the curing of animal hide, and that collagen leather is a product with properties and an appearance equal or similar to those of natural leather obtained from the processing of collagen of animal origin or of a different origin.

For example, collagen leather may be produced from collagen obtained from the recycling of natural leather, or from collagen produced by cultures of cells that have been genetically modified to produce collagen.

The layer of waterproof, breathable material is a layer that prevents the passage of liquid water therethrough but which allows the passage of air and water vapour therethrough. This may be achieved, for example, by means of a layer provided with pores whose size is of the order of thousands of times smaller than the size of the water droplets, but which is of the order of hundreds of times larger than the size of the water vapour molecules.

Preferably, the water vapour permeability of the waterproof, breathable material will be equal to or greater than 475 $g/cm^2$, said values being liable to be measured, for example, through the guidelines of standard BS 7209:1990 in effect on the date the present application was filed.

It is also contemplated that said waterproof material layer have a resistance to the passage of water equal to or greater than 10 psi during at least 2 minutes, said values being liable to be measured, for example, through the guidelines of standard ISO 811:2018 in effect on the date the present application was filed.

The combination of the waterproof, breathable layer with the leather layer with holes of micro-holes offers a breathable material, since all of its components allow for that breathability, as well as waterproofness, as the waterproof layer will prevent the passage of water through the obtained multi-layered leather material.

The present invention proposes the following features unknown in the state of the art.

It is proposed that the leather layer be coated with a hydrophobic agent to prevent the absorption of water or other liquids through the holes and/or micro-holes, also avoiding the absorption of water by capillarity through said holes and/or micro-holes.

Said hydrophobic agent may be soaked into the leather during its tanning process, or at the end of said process, or be included in the collagen leather during its manufacturing.

The coating of the hydrophobic agent will allow to reduce, to a large extent, or completely eliminate, the absorption of the leather, but its breathability and its permeability through the holes and/or micro-holes will be retained.

It is proposed that, optionally, the hydrophobic agent be silicone ester.

As the leather layer is treated with a hydrophobic agent, the leather layer enjoys hydrophobic properties, so that full grain leather may be employed without a surface coating, thereby managing to retain the appearance that is characteristic of full grain leather without the inconvenience of the absorption this type of hide has.

Preferably, the hydrophobic additive will be applied to obtain a leather layer with an absorption lower than 10%, or a capillary absorption level lower than 1 cm/h, relative to an equivalent leather layer without the hydrophobic agent coating, said values being liable to be measured, for example, by means of the guidelines of standard EN ISO 2417 in effect on the date the present application was filed.

According to another proposed embodiment, the leather layer may additionally have a surface coating on its side opposite the side wherein the waterproof material layer is adhered. Said surface coating is typically used to waterproof the leather, and for improving its resistance or aesthetics, but in this case the leather is already waterproof, and the presence of holes and/or micro-holes would eliminate the waterproofing effect of the surface coating. Therefore, the surface coating only has an aesthetic and resistance purpose, but not waterproofing.

The surface coating may be, for example, polyurethane varnish.

It is also suggested that the leather layer be coated with graphene-based doping agents. Traditionally, the leather's abrasion and rupture resistance is improved by means of the application of chrome during the tanning process of the hides; however, this additive has generally been eliminated due to its high toxicity. The application of graphene to leather, during or after the tanning of the natural leather or during the manufacturing step of the collagen leather, allows to improve, to a large extent, its capabilities of abrasion and rupture resistance. The graphene-based additive is an additive that may be absorbed by the leather and which contains graphene fragments which remain embedded inside the treated leather, strengthening it.

This allows the use of this multi-layered material in applications where it is subject to intensive wear by abrasion or rupture, such as, for example, for the manufacturing of protective clothing, for example cycling, motorcycling, skiing or similar jackets, trousers or gloves or for rucksacks, suitcases or wallets that may carry a lot of weight.

The leather layer may also be coated with an infrared-reflecting agent. This allows to reduce the temperature reached by the material when it is exposed to sunlight, reducing its overheating in such circumstances.

Additionally, it is also proposed the inclusion of a reinforcing layer of non-water-absorbing, breathable material, adhered by means of hydrolysis-resistant adhesives arranged in a non-laminar fashion that allow for breathability, the layer of waterproof, breathable material remaining between the leather layer and the reinforcing layer.

This reinforcing layer will not alter the breathable and waterproof properties of the assembly, but it will protect the waterproof, breathable layer from wear, chafing, tears, etc. that may alter its waterproof capability.

Alternatively, or additionally, the inclusion of a 3D fabric layer of non-water-absorbing, breathable material is proposed, adhered by means of hydrolysis-resistant adhesives arranged in a non-laminar fashion that allow breathability, the layer of waterproof, breathable material remaining between the leather layer and the 3D fabric layer.

This 3D fabric layer will offer an additional padding to the resulting multi-layered material, it will protect the waterproof, breathable layer, and it will also allow for the air circulation throughout its interior, thereby improving the breathability of the resulting multi-layered material.

It is understood that a 3D fabric is a fabric wherein the fibres are woven following a three-dimensional pattern, obtaining in every stitch a fabric of greater thickness than the sum of the thicknesses of the fibres used in that stitch, gaps remaining on the inside of said fabric, and thereby obtaining a fabric of greater volume.

According to another anticipated embodiment, at least one heating resistor may be included between the layers of the multi-layered material, said heating resistor being connected to a power source. This feature allows to obtain a heated or heating multi-layered material.

The proposed multi-layered material may be used in at least part of a leather product selected among bag, rucksack, wallet, suitcase, or the like, in part of a piece of upholstery, or in parts of a garment.

The use of the multi-layered leather material in clothing, such as, for example, jackets, coats, trousers, shoes or gloves, allows for the perspiration of body heat and of sweat, while preventing the inflow of rainwater from the outside. The graphene inclusion improves the mechanical protection offered by that garment; the inclusion of the 3D fabric improves the breathability, making the material cooler, and/or the inclusion of heating resistors improves the thermal comfort in cold climates.

The use of the multi-layered leather material in a rucksack, bag, wallet, suitcase or the like allows to ensure that outside water or rainwater will not wet its contents, while any interior humidity will be able to exit without building up therein.

The multi-layered material and/or the leather product in which said multi-layered material is integrated, may also include seams sealed by means of a waterproof adhesive tape adhered on top of said seams in order to ensure the complete waterproofing of said seams.

The cooling of the inside air of a bag or suitcase, for example when it exists, may produce the condensation of the humidity of the inside air. The breathable capability of the proposed multi-layered leather material allows for the exit of humidity, avoiding its condensation.

The proposed inclusion of heating resistors may allow to ensure that the inside temperature of the bag or suitcase will, at all times be slightly above the outside temperature, increasing the certainty that no condensation will be produced in its interior. This is especially important in the case of bags intended for carrying electronic equipment, which may be damaged in case condensation is produced in its interior.

The use of the multi-layered leather material in upholstery allows for the breathability of the user that is in contact with said upholstery, typically the breathability of the legs and back of a user seated on an upholstered seat. The waterproof property of the proposed material allows that the upholstery be washable and suitable for outdoor use.

The inclusion of graphene in the material used in upholstery will improve the working life of said upholstery; the inclusion of 3D fabric will allow for an improved breathability achieving greater thermal comfort in warm climates, as well as a softer and more comfortable material.

The inclusion of heating resistors in said multi-layered material will allow obtaining heated upholsteries that will offer greater comfort in cold climates.

Other features of the invention will appear in the following detailed description of an exemplary embodiment.

BRIEF DESCRIPTION OF THE FIGURES

The Foregoing and Other Advantages and Features Will be More Fully Understood from the Following Detailed Description of an Exemplary Embodiment with Reference to the Attached Drawings, which Must be Taken in an Illustrative and Non-Limiting Way, Wherein.

DETAILED DESCRIPTION OF AN EXEMPLARY EMBODIMENT

Figure 1:
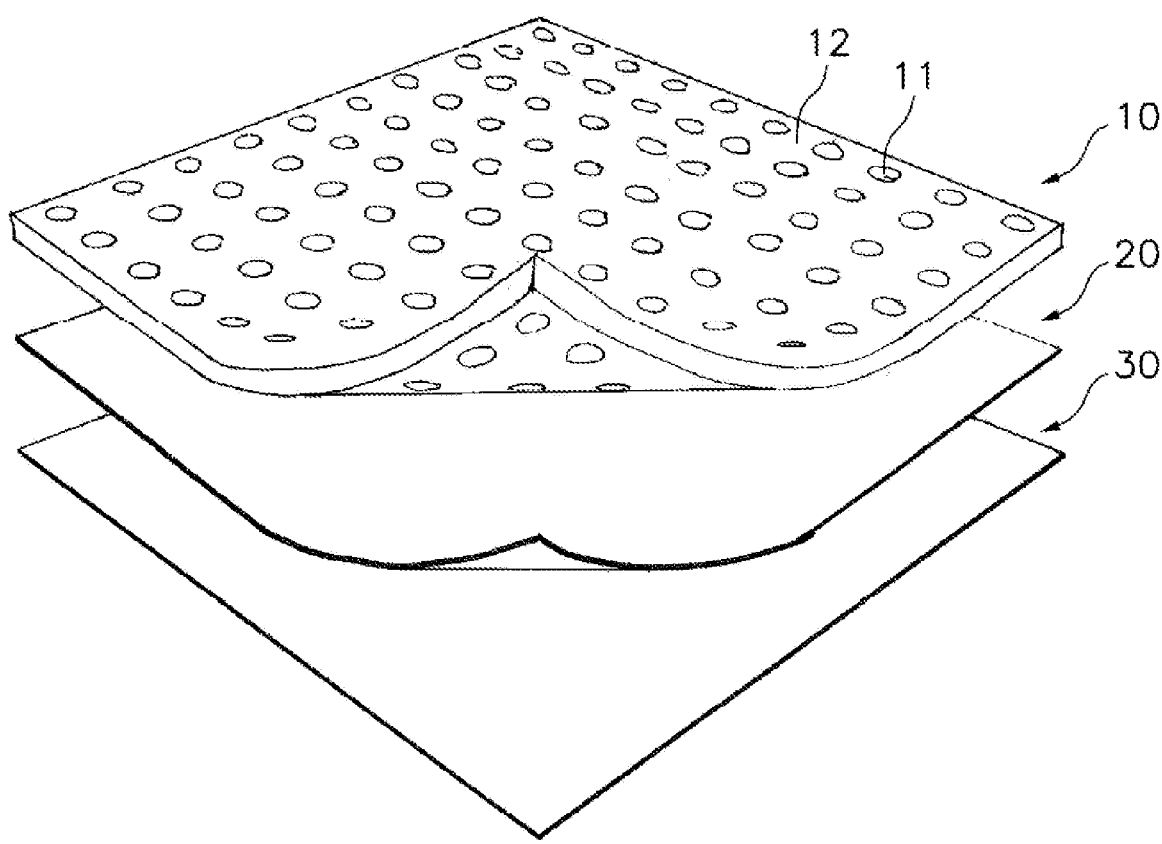
FIG. 1 depicts an exploded view of a portion of the multi-layered leather material according to an embodiment provided with three layers.

The attached figures depict exemplary embodiments with a non-limiting illustrative character of the present invention.

According to a preferred exemplary embodiment of the present invention, the creation a waterproof, breathable multi-layered leather material provided with the following layers is proposed.

A natural leather layer 10 that, during its curing treatment, has been coated with silicone esters to provide it with hydrophobic properties, and which has been subsequently micro-perforated with an array 11 of micro-through holes that cross it.

Optionally, a side of the natural leather layer 10 may receive a polyurethane varnish surface coating 12 before being micro-perforated. It is also contemplated, optionally, that the leather layer 10 be treated with a graphene-based doping agent to increase its tear and abrasion resistance.

The resulting leather layer 10 will be breathable thanks to the micro-holes 11, and it will not absorb water, thanks to the hydrophobic treatment, although it will not be waterproof, since the water will be able to go through the micro-holes 11. However, the highly hydrophobic properties of the treated leather will reduce or prevent the absorption of water through said micro-opening by capillary action.

Another one of the layers that make up the multi-layered leather material is a layer 20 of waterproof, breathable material, which allows the passage of air and vapour but prevents the passage of liquid water therethrough.

This waterproof, breathable layer 20 may be, for example, a layer provided with a number of pores with a size comprised between a size thousands of times smaller than the size of the water droplets and a size hundreds of times larger than the size of the water vapour molecules. In that range of sizes, the pores will allow the passage of vapour and prevent the passage of water droplets.

Optionally, a third layer will also be included in the multi-layered material which will cover the waterproof, breathable material 20 layer, protecting it. This additional layer may be a protective layer 30 of non-absorbing, breathable material, or a non-absorbing, breathable 3D fabric layer.

Figure 2:
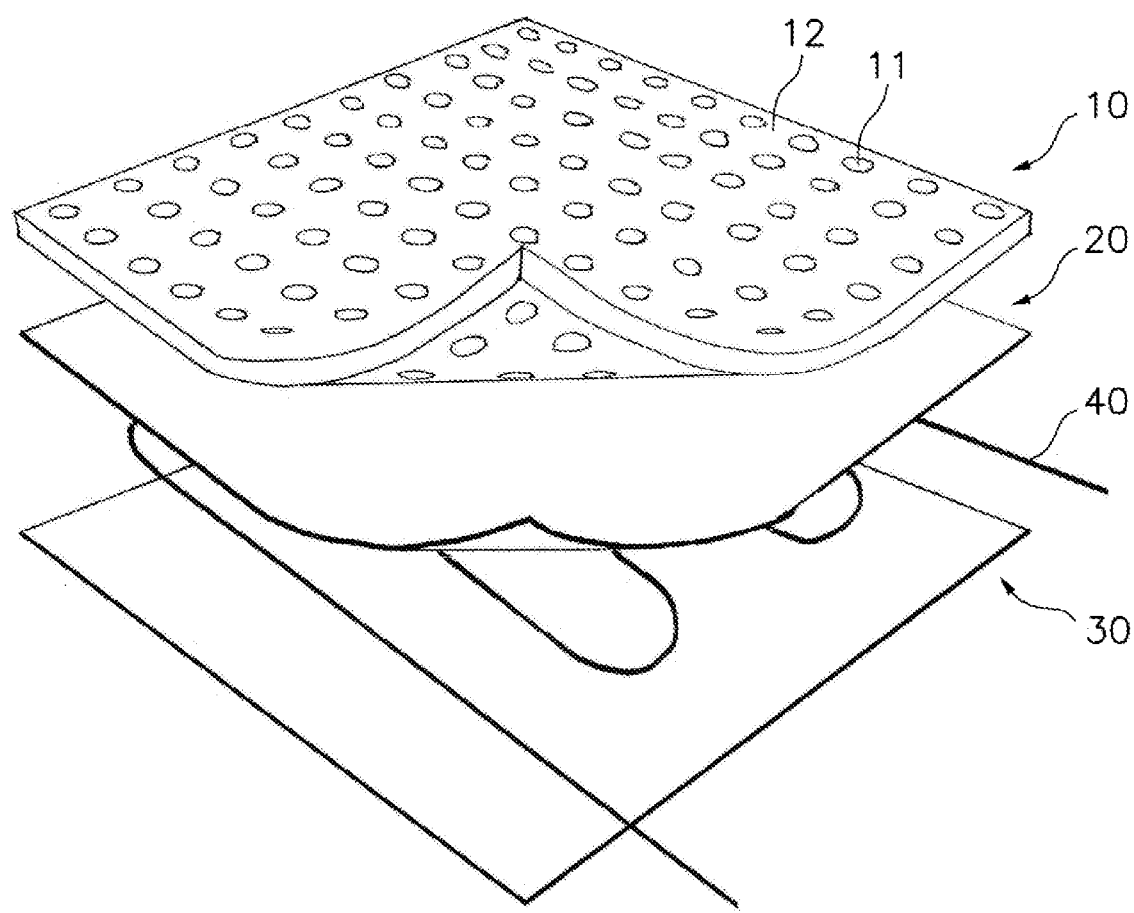
FIG. 2 depicts an exploded view of a portion of the multi-layered leather material according to another embodiment provided with three layers and a heating resistor in the shape of a winding, flexible filament arranged between the waterproof, breathable layer and the reinforcing layer.

Optionally, it is also contemplated to embed, between the layers of the proposed multi-layered material, a heating resistor 40, shown in FIG. 2, in the shape of a flexible cable. When connecting said heating resistor 40 to a power source, such as a battery, heat will be generated in distributed manner. Said heating resistor 40 may be, as shown in the example, a winding cable.

All the layers of the multi-layered leather material are superimposed and adhered with each other by means of hydrolysis-resistant adhesives—that is, they do not degrade in contact with water or vapour—arranged in a non-laminar fashion—that is, they do not extend as a sheet between the layers that might act as a breathability barrier—.

It is proposed to disperse the adhesive, for instance, in the form of a spray, which deposits droplets or micro-droplets separated from each other throughout the surface to be adhered immediately before proceeding to the assembly of the layers.

An alternative embodiment may consist in dispersing an adhesive in powder form dispersed throughout the surface of one of the sides to be adhered, and subsequently superposing the layers and cause the material to go through a grille that, by means of heat application, activates the adhesive powder particles producing the adhesion.

Another embodiment may consist in controllably depositing droplets or spaced lines of adhesive throughout the surface to be adhered.

Any of the described solutions, or others, will offer an adhesion on the whole surface, but will prevent the adhesive from acting as a barrier to the breathability of the proposed multi-layered material.

It will be understood that the different parts constituting the invention described in an embodiment may be freely combined with the parts described in other different embodiments even if said combination has not been explicitly described, as long as there is no prejudice to the combination.

What is claimed is:

1. A breathable, waterproof multi-layered leather material that includes the following layers superimposed and adhered by means of hydrolysis-resistant adhesives, said adhesives being arranged in a non-laminar fashion allowing for breathability:
   a natural leather or collagen leather layer, this leather layer including holes and/or micro-holes to increase its breathability;
   a layer of waterproof and breathable material impermeable to water and permeable to air;
   wherein the leather layer and the correspondent holes and/or micro-holes are treated with a hydrophobic agent to avoid the leather layer from absorbing water through the holes and/or the micro-holes.

2. The multi-layered leather material according to claim 1, wherein the hydrophobic agent is silicone ester.

3. The multi-layered leather material according to claim 1, wherein the leather layer has a surface coating on the side opposite to the side wherein the waterproof and breathable material layer is adhered.

4. The multi-layered leather material according to claim 3, wherein the surface coating is polyurethane varnish.

5. The multi-layered leather material according to claim 1, wherein the leather layer is coated with graphene-based doping agents and/or with an infrared-reflecting agent.

6. The multi-layered leather material according to claim 1, wherein a reinforcing layer is also included, said reinforcing layer being of non-water-absorbing, breathable material, and being adhered by means of hydrolysis-resistant adhesives arranged in a non-laminar fashion allowing for breathability, the layer of waterproof, breathable material remaining between the leather layer and the reinforcing layer.

7. The multi-layered leather material according to claim 1, wherein a 3D fabric layer is also included, said 3D fabric layer being of non-water-absorbing, breathable material, and being adhered by means of hydrolysis-resistant adhesives arranged in a non-laminar fashion allowing for breathability, the layer of waterproof, breathable material remaining between the leather layer and the 3D fabric layer.

8. The multi-layered leather material according to claim 1, wherein at least a heating resistor is also included between the layers, said heating resistor being connected to a power source.

9. The multi-layered leather material according to claim 1, wherein the adhesive is water-repellent.

10. The multi-layered leather material according to claim 1, wherein
    the leather layer treated with the hydrophobic agent has an absorption equal to or smaller than 10% relative to an equivalent leather layer without a hydrophobic agent coating, and/or
    the leather layer treated with the hydrophobic agent has a capillary absorption equal to or smaller than 1 cm/h relative to an equivalent leather layer without a hydrophobic agent coating, and/or
    the layer of waterproof, breathable material has a water vapour permeability equal to or greater than 475 g/m$^2$; and/or
    the layer of waterproof, breathable material has a resistance to the passage of water equal to or greater than 10 psi during at least 2 minutes.

11. Leather product including a breathable, waterproof multi-layered leather material that includes the following layers superimposed and adhered by means of hydrolysis-resistant adhesives, said adhesives being arranged in a non-laminar fashion allowing for breathability:
    a natural leather or collagen leather layer, this leather layer including holes and/or micro-holes to increase its breathability;
    a layer of waterproof and breathable material impermeable to water and permeable to air;
    wherein the leather layer and the correspondent holes and/or micro-holes are treated with a hydrophobic agent to avoid the leather layer from absorbing water through the holes and/or the micro-holes; and
    wherein the leather product is selected among a bag, rucksack, wallet, suitcase, piece of upholstery, a garment or protective clothing.

12. Leather product according to claim 11 wherein the leather product includes seams sealed by a waterproof adhesive tape adhered on top of said seams.

* * * * *